Oct. 18, 1932.  A. F. SHORE  1,883,019

VIEW ANALYZER

Filed May 24, 1926

INVENTOR
Albert F. Shore
BY
Isaac Hoffman
ATTORNEY

Patented Oct. 18, 1932

1,883,019

UNITED STATES PATENT OFFICE

ALBERT F. SHORE, OF NEW YORK, N. Y.

VIEW ANALYZER

Application filed May 24, 1926. Serial No. 111,150.

My invention relates to improvements in optical viewing devices of the periscope variety, and while not a periscope in itself in the true sense, it serves a purpose somewhat similar, both in that it may be used in connection with a regular periscope or independently by itself.

The main object of the invention is to provide an instrument for view analyzing which operates to substantially efface foreground objects or obstructions or those close to the observer and to open up in favor of or to clarify the view of certain distant objects. This is accomplished by me by taking advantage of the difference in angle of the infinite or nearly parallel incident rays of light and those of points in closer proximity which are relatively more acute and which makes it possible to use a form of optical construction which is adapted to throw the image of the foreground objects or obstructions quickly and continuously in different directions. In other words, to make them dance so that they will appear as a blur or become almost wholly invisible without materially affecting the stability of the more distant objects. This effect may be illustrated by a view taken from a moving vehicle, when, while objects close up will appear as a mere streak of indefinite forms, the more distant view is not only substantially unaffected because of the comparative slowness of relative motion but the same may be easily seen with but slight interference through partial obstructions, as trees, tall grass, etc.

My invention is applicable to various uses, for instance: military observation, range finding and gun pointing under camouflage, and for sporting purposes, as in hunting and rifle shooting under similar or otherwise difficult conditions. When utilized for such purposes, it is possible to easily detect more distant objects that are partly screened in the manner stated, rendering them more clearly visible.

In carrying into practice the method above mentioned, I preferably employ a refractive element having prism-like qualities to bring about a lateral deflection of the image, which, as described above, will be infinitesimal in the distance although very pronounced and comparatively speedy relative to nearby objects. Such lateral deflection as pointed out, to be effective is supplemented by a rapid continuous shifting of the refractive element preferably by rotating it on an axis substantially parallel to the direction of vision.

Referring to the drawing accompanying and forming part of this application:

Figure 2:
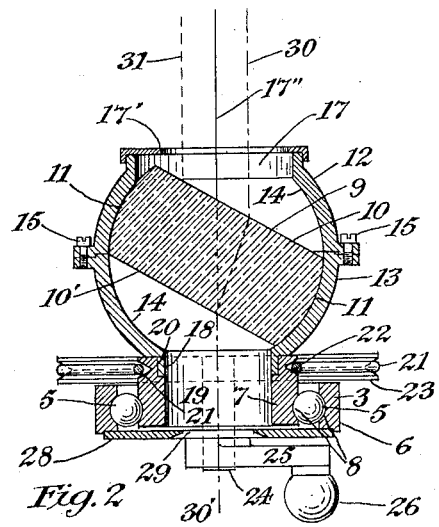
Fig. 2 is a horizontal section of the same, taken on line 2—2 of Fig. 1, showing also the paths of incident and refracted light rays.
Figure 3:
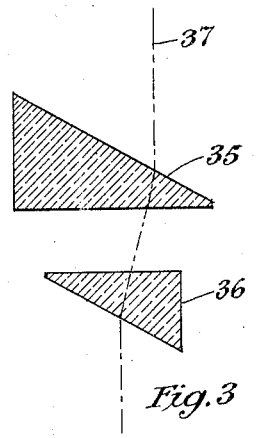
Figure 1:
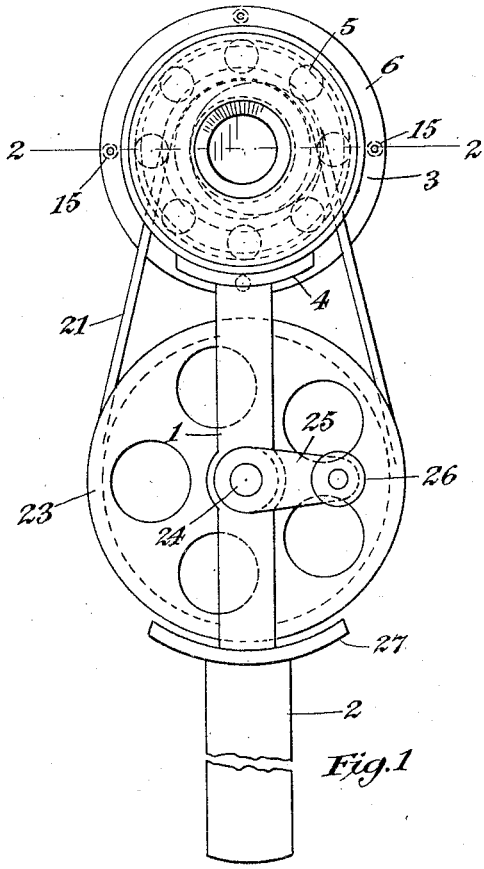
Figure 1 is a front elevation of one embodiment of my view analyzer.
Figure 4:
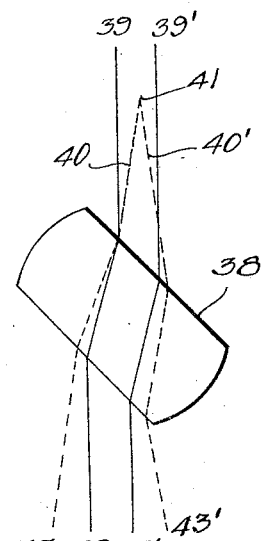

Fig. 3 shows an arrangement of two tapered prisms which may be used as optical equivalents for the tilted glass-plate refractor of Figs. 2 and 4, adjustments of refracting power of the prisms being found in the variations of the distance between them, refracted through the said tilted plate, an example of the incident and refracted light rays being also shown; and Fig. 4 is a diagram of the parallel refractor, also shown in Fig. 2, indicating the path of parallel rays of light coming from distant objects and also the more angular rays of light coming from points comparatively near by, also the manner in which the rays are bent on passing through the glass.

Similar characters of reference designate like parts in all the figures of the drawing.

Any suitable means may be employed to more or less rapidly and continuously shift the position of the refractive element or unit above referred to, but in the form here shown, I provide a mechanism to "shift" it on an axis substantially parallel to the direction of vision. Preferably, said mechanism is provided with a frame, such as indicated by 1, having a handle 2 and adapted to support a member such as the bearing 3, as by securing it to a portion 4. Preferably, the bearing 3 is a ball bearing having balls 5, an outer ring 6 by which in this instance it is secured to the portion 4, and an inner ring 7, said rings having the usual ball races 8.

Preferably, the refractive unit is rotatably secured in proximity to the ring 7 and said unit may be of any suitable form, such as the glass disk 9 having the two parallel faces 10 and 10' and a semi-spherical periphery 11. It may be held by any suitable means, such as the members 12 and 13, having semi-spherical interior surfaces 14 adapted to fit the periphery 11 of the disk 9. Suitable means, such as the screws 15, or their equivalent, are provided to clamp the members 12 and 13 to firmly hold the disk 9 at any predetermined angle.

The member 12 has an opening 17, inside toward the landscape to be viewed, and a cap 17' having an opening arranged eccentric with the spinning axis of the glass disk 9 on line 17''. The member 13 has a tubular extension 18 and an opening 19 corresponding with the opening in the ring 7. The ring 7 has an annular recess 20 into which the tubular extension 18 fits and is secured in said recess by suitable means, such as by sweat soldering. The ring 7 may be caused to move by any suitable means but preferably it is continuously rotated by the belt 21 operating in the annular groove 22 of said ring. The belt is driven by a pulley 23 secured to a short shaft 24, having a bearing in the frame 1 and turned by a crank 25 having a handle 26 secured to it. There is a hilt-plate 27 forming part of the frame 1 next to the handle 2 and adapted to guard the hand of the operator from contact with the pulley 23. There is a plate 28 secured to the outer ring 6 of the ball bearing which plate is provided with an eye aperture 29 through which objects are viewed. Referring to Fig. 3, 35 is a form of the first prism of the wedge shaped variety, whereas 36 is a form of the second wedge shaped prism of equal power and which latter may be regarded as the eye-piece unit.

Referring to Fig. 2, the dotted line 30 indicates the path taken by the parallel incident light-rays as they pass through my new view-analyzing instrument and before entering the eye-piece 30'.

Referring to Fig. 3, the dotted line 37 indicates the path taken by similar parallel incident light-rays and which light-rays are first bent over or shifted toward the axis line by the prism 35 and then again straightened parallel with the said axis line and also corrected as to dispersion by the second prism 36.

Referring to Fig. 4, the numeral 38 designates a diagram of the parallel-sided refractor shown at 9 in Fig. 2, with a set of incident light-rays, of which the full lines 39 and 39', respectively, indicate the parallel light-rays coming in from the infinite distance, whereas the dotted lines 40 and 40', respectively, indicate two angular light-rays issuing from a near-by point 41. The lower ends of the full lines at 42 and 42' indicate the position of the bent light-rays indicated by the full lines at 39 and 39', whereas the lower ends of the dotted lines at 43 and 43' indicate the comparative oblique approach of the angular rays of light, indicated by the dotted lines at 40 and 40', toward the eye-piece. Referring once more to Fig. 2, the dotted line 31 indicates the amount of throw given to the incident light-rays, as when the prism-holder 12—13 is moved a one-half turn. The path of these light-rays, passing through the glass and over to the axis-line and into the eye-piece at 30', is not shown.

In the general construction, I do not limit myself specifically to the forms shown in the drawing. For instance, the glass disk 9 may be mounted in a different kind of housing, with any desired means of adjustment with reference to the angle. Two wedge-shaped prisms may be used instead of the glass disk with its two parallel faces, or a square block of glass polished on all sides may be spun around. A rocking motion may be used to alternately vary the degree of tilt of the prism instead of a fixed angle, which is then spun around. A gear train set may be used instead of the pulleys and belt, or even a small motor, for spinning or wobbling the refractive element or unit.

The operation of the device is as follows: The handle 2 is grasped in the hand, and, after having adjusted the refractive element or unit 9 to the desired angle to adapt it to the different ratios of distances as the foreground and the background, and the unit having then been firmly clamped in the holder 12—13, the eye of the observer is placed near the eye aperture and focused upon the distant object or objects to be viewed, the same as when using a simple opera glass or telescope. The crank 25 is then turned by means of its handle 26 causing the rotation of the pulley 23 which by means of the belt 21 turns the ring 7 by means of its annular groove 22. This causes the continuous rotation of the two members forming the holder of the disk 9 and by means of this the latter is turned. Light rays from the foreground objects are by these means caused to be rapidly bent laterally first on one side and then on the other. Thus, there is a rapid continuous shifting effected of the images of near objects, while the background or distant objects are substantially unchanged in the retina. The said lateral shifting results in a blur that renders the near objects substantially invisible. The result will then be that such obstructions as twigs, small trees, or tall grass stems, whether vertical or horizontal, etc., will be thrown sideways and up and down so as to cause only a transparent blur, and, therefore, rendered quite negligible as otherwise serious obstructions, it being understood that in order to accomplish this, the obstructions in the foreground are somewhat less illuminated than the objects in the background. The instrument thus brought to a key-hole or a slot would similarly rapidly and continuously shift these limited openings to both sides of their actual positions, hence apparently widening them up so that a comparatively broad view is obtained beyond the keyhole or slot.

As numerous changes may be made in the above construction and many apparently widely different embodiments of my invention designed without departing from the scope of the appended claims, I intend that all matter contained in the foregoing description and the construction shown in the accompanying drawing shall be interpreted as illustrative merely of the optical principle involved and an operative example of my invention rather than a specific design.

I claim:

1. In an optical instrument, a rotatably mounted globular casing having an axial opening therethrough, a refractive element having opposite plane surfaces and an arcuate peripheral portion to conform to the casing walls and releasably carried by the casing to permit adjustment thereof on an axis transversely of the axis of rotation of the casing and adapted to deflect the light rays traveling in an oblique direction relative to the axis of rotation toward the lateral portions of the refractive element, and means to continuously rotate the casing and thereby disperse the light rays at the lateral portions of the refractive element.

2. In an optical instrument, a frame member arranged with a handle portion, a casing rotatably mounted in the frame member and having openings at opposite ends, a refractive element releasably carried by the casing to permit adjustment thereof in angular relation to the casing openings and adapted to deflect the light rays traveling in an oblique direction relative to one of the openings, and means mounted on the frame member adjacent the handle and operatively connected to the casing to rotate the same and thereby disperse the light rays at the lateral portions of the refractive element.

3. An optical instrument as claimed in claim 1, wherein the casing comprises a pair of detachable and mating shells arranged to form a spherical chamber therein, and the refractive element is adapted to be clamped in adjusted angular positions in said chamber.

4. An optical instrument as claimed in claim 2, wherein the casing opening through which the light rays enter is arranged eccentric to the axis of the casing, and the other opening is arranged concentric of said axis.

5. An optical instrument as claimed in claim 2, wherein the refractive element comprises a plurality of right triangular members.

6. An optical instrument as claimed in claim 2, wherein the means to rotate the casing comprises a pulley rotatably mounted on the frame member having a crank connected thereto, and a belt operatively connecting the pulley with the casing to transmit the rotation of the pulley to said casing.

7. An optical instrument as claimed in claim 2, wherein one of the casing openings is arranged eccentrically to the axis of the casing and through which opening the light rays enter the casing and the opposite opening is arranged concentric to the axis of the casing, and the refractive element is adapted to deflect the light rays traveling parallel to the axis of the casing to pass through the concentric casing opening substantially concentrically thereof.

8. In an optical instrument, a frame having a handle for holding the same, a ball-bearing member secured to said frame, said member having an annular recess, a refractive element having prism-like qualities, a movable support for the refractive element, said movable support comprising two members, one of which is provided with a tubular extension to fit in the annular recess of the ball-bearing member, and the other of which is provided with a central opening, said last-mentioned member being also provided with a cap having an opening arranged eccentric with the spinning axis of the refractive element, and belt-driven means carried by said frame for continuously rotating said ball-bearing member, refractive element and its movable support, respectively, on an axis substantially parallel to the direction of vision.

In testimony whereof, I affix my signature.

ALBERT F. SHORE.